United States Patent
Buczek

(10) Patent No.: US 8,983,373 B2
(45) Date of Patent: Mar. 17, 2015

(54) COMMUNICATIONS SYSTEM PROVIDING ENHANCED MOBILE DEVICE HOLDER DETECTION BASED UPON NFC COMMUNICATION AND RELATED METHODS

(75) Inventor: Tomasz Buczek, Oakville (CA)

(73) Assignee: BlackBerry Limited, Waterloo, Ontario (CA)

( * ) Notice: Subject to any disclaimer, the term of this patent is extended or adjusted under 35 U.S.C. 154(b) by 941 days.

(21) Appl. No.: 13/158,111

(22) Filed: Jun. 10, 2011

(65) Prior Publication Data

US 2012/0315845 A1    Dec. 13, 2012

(51) Int. Cl.
*H04B 5/00* (2006.01)
*H04M 1/725* (2006.01)
*H04W 24/00* (2009.01)

(52) U.S. Cl.
CPC ........ H04M 1/7253 (2013.01); H04M 1/72572 (2013.01); *H04M 2250/04* (2013.01)
USPC ...................................... 455/41.1; 455/456.1

(58) Field of Classification Search
USPC .............. 455/41.1, 90.3, 550.1, 556.1, 575.1, 455/575.8
See application file for complete search history.

(56) References Cited

U.S. PATENT DOCUMENTS

| | | | | |
|---|---|---|---|---|
| 7,555,326 B2 | 6/2009 | Infanti | ........................ | 455/575.8 |
| 2004/0180649 A1 | 9/2004 | Vogel et al. | ..................... | 455/418 |
| 2005/0222961 A1 | 10/2005 | Staib et al. | ...................... | 705/64 |
| 2006/0022822 A1 | 2/2006 | Wong et al. | ................. | 340/568.1 |
| 2006/0073819 A1 | 4/2006 | Lowles | ......................... | 455/418 |
| 2006/0148404 A1 | 7/2006 | Wakim | ......................... | 455/41.2 |
| 2006/0287004 A1 | 12/2006 | Fuqua | ............................ | 455/558 |
| 2007/0095892 A1 | 5/2007 | Lyons et al. | .................. | 235/379 |
| 2007/0124503 A1 | 5/2007 | Ramos et al. | ................. | 709/248 |
| 2007/0156436 A1 | 7/2007 | Fisher et al. | ..................... | 705/1 |
| 2007/0165863 A1 | 7/2007 | Moosavi | ....................... | 380/283 |

(Continued)

FOREIGN PATENT DOCUMENTS

| | | | | |
|---|---|---|---|---|
| EP | 1411709 | 4/2004 | ............ | H04M 1/725 |
| EP | 2302882 | 3/2011 | | |

(Continued)

OTHER PUBLICATIONS

U.S. Appl. No. 12/977,245, filed Dec. 23, 2010, Moosavi et al.

(Continued)

*Primary Examiner* — Yuwen Pan
*Assistant Examiner* — Ayodeji Ayotunde
(74) *Attorney, Agent, or Firm* — Allen, Dyer, Doppelt, Milbrath & Gilchrist, P.A.

(57) ABSTRACT

A communications system may include a first mobile device holder and a first trigger device associated therewith, a second mobile device holder different than the first mobile device holder and a second trigger device associated with the second mobile device holder, and a first NFC device associated with the first mobile device holder. The system may further include a mobile device configured to be removably coupled with the first holder or the second holder, a second NFC device carried by the housing, and a detector carried by the housing and configured to detect the first trigger device or the second trigger device. The mobile device may also include a controller carried by the housing and configured to determine positioning adjacent the first or second holder based upon the second NFC device and the detector, and operate in a respective first or second operating mode accordingly.

25 Claims, 6 Drawing Sheets

(56) References Cited

U.S. PATENT DOCUMENTS

| | | | |
|---|---|---|---|
| 2007/0176903 A1 | 8/2007 | Dahlin et al. | 345/169 |
| 2007/0197261 A1 | 8/2007 | Humbel | 455/558 |
| 2007/0266131 A1 | 11/2007 | Mazur et al. | 709/223 |
| 2008/0012706 A1 | 1/2008 | Mak-Fan et al. | 340/568.1 |
| 2008/0034217 A1 | 2/2008 | McQuaide | 713/186 |
| 2008/0049372 A1 | 2/2008 | Loke | 361/143 |
| 2008/0116847 A1 | 5/2008 | Loke et al. | 320/108 |
| 2008/0191892 A1* | 8/2008 | Kirkup et al. | 340/686.6 |
| 2008/0246667 A1 | 10/2008 | Symons | 343/702 |
| 2008/0272889 A1 | 11/2008 | Symons | 340/10.1 |
| 2009/0023457 A1* | 1/2009 | Buer et al. | 455/456.1 |
| 2009/0096413 A1 | 4/2009 | Partovi et al. | 320/108 |
| 2009/0134973 A1* | 5/2009 | Sandler et al. | 340/10.1 |
| 2010/0085840 A1 | 4/2010 | Lazaridis et al. | 386/10 |
| 2010/0099354 A1 | 4/2010 | Johnson | |
| 2010/0264746 A1 | 10/2010 | Kazama et al. | 307/104 |
| 2011/0070826 A1* | 3/2011 | Griffin et al. | 455/41.1 |

FOREIGN PATENT DOCUMENTS

| | | | |
|---|---|---|---|
| WO | 2006/054070 | 5/2006 | |
| WO | 2006/109032 | 10/2006 | |
| WO | 2007/112787 | 11/2007 | H04B 5/02 |

OTHER PUBLICATIONS

U.S. Appl. No. 12/565,893, filed Sep. 24, 2009, Griffin et al.
U.S. Appl. No. 13/017,473, filed Jan. 31, 2011, Moosavi et al.

* cited by examiner

COMMUNICATIONS SYSTEM PROVIDING ENHANCED MOBILE DEVICE HOLDER DETECTION BASED UPON NFC COMMUNICATION AND RELATED METHODS

TECHNICAL FIELD

This application relates to the field of communications, and more particularly, to electronic devices and related methods that use near-field communication (NFC).

BACKGROUND

Mobile communication systems continue to grow in popularity and have become an integral part of both personal and business communications. Various mobile devices now incorporate Personal Digital Assistant (FDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

DETAILED DESCRIPTION

Figure 1:
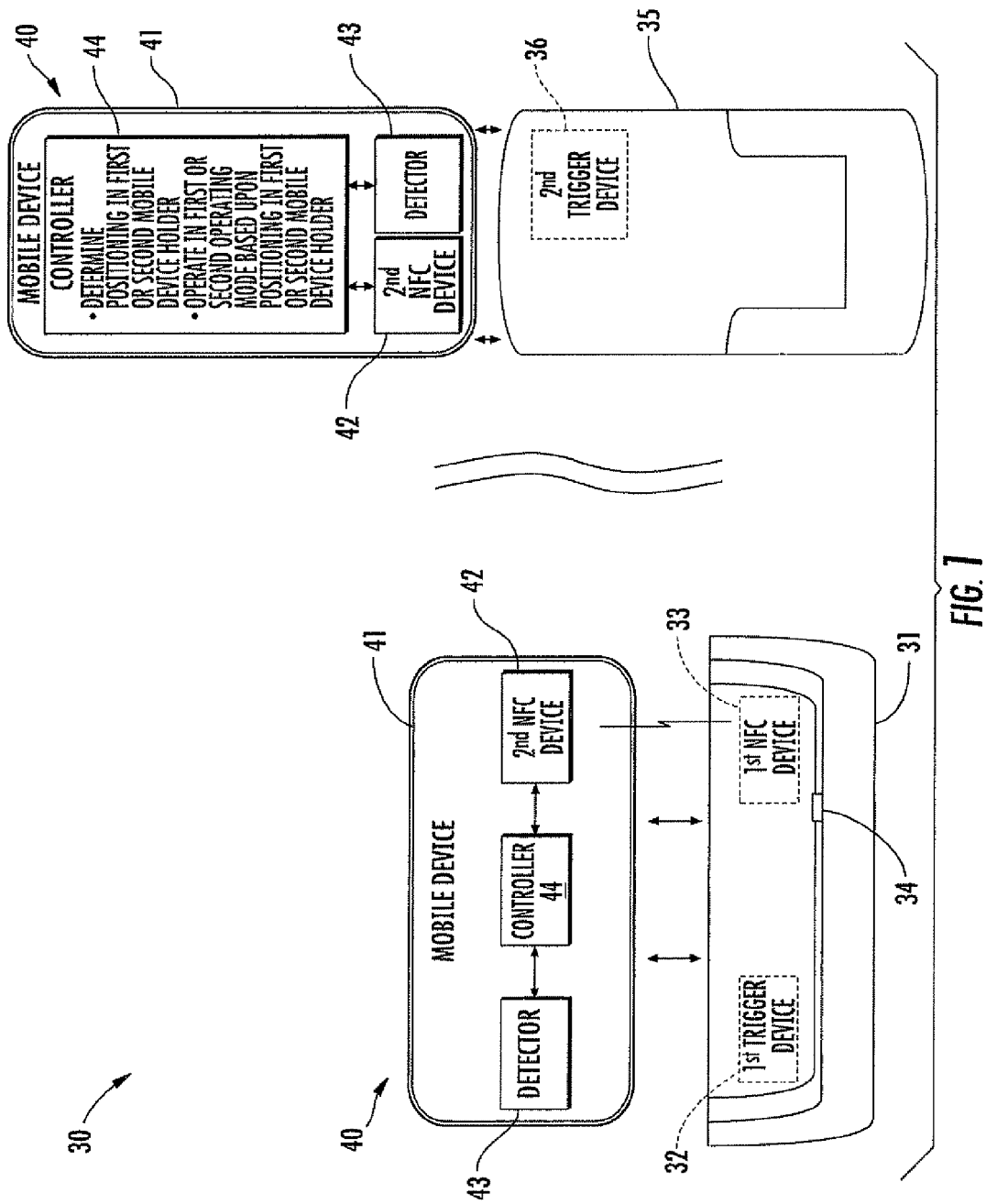
FIG. 1 is a schematic block diagram of a communications system in accordance with one example aspect.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a communications system is disclosed herein which may include a first mobile device accessory and a first trigger device associated with the first mobile device accessory, a second mobile device accessory different than the first mobile device accessory and a second trigger device associated with the second mobile device accessory, and a first near field communication (NFC) device associated with the first mobile device accessory. The system may further include a mobile device configured to be removably coupled with the first mobile device accessory or the second mobile device accessory, a second NFC device configured to communicate with the first NFC device via NFC communications, and a detector configured to detect the first trigger device or the second trigger device. The mobile device may also include a controller configured to determine positioning of the mobile device adjacent the first mobile device accessory when the detector detects the first trigger device and when the second NFC device is in NFC communication with the first NFC device, determine positioning of the mobile device adjacent the second mobile device accessory when the detector detects the second trigger and when the second NFC device is not in NFC communication with the first NFC device, operate in a first operating mode based upon positioning adjacent the first mobile device accessory, and operate in a second operating mode different than the first operating mode based upon positioning adjacent the second mobile device accessory. Accordingly, the mobile device may advantageously provide different operating features by using NFC to identify a type of accessory it is placed in or adjacent to, while allowing for NFC scanning to be reduced or stopped to advantageously decrease power consumption.

More particularly, the system may further include a third NFC device associated with the second mobile device accessory. As such, the controller may be configured to determine positioning adjacent the second mobile device accessory when the detector detects the second trigger device and when the second NFC device is in NFC communication with the third NFC device.

In addition, the mobile device may further comprise at least one input device coupled to the controller and switchable between active and inactive states, and the controller may be further configured to switch the at least one input device to the active state in the first operating mode, and to the inactive state in the second operating mode. Similarly, the mobile device may further comprise a display coupled to the controller and switchable between active and inactive states, and the controller may be further configured to switch the display to the active state in the first operating mode, and to the inactive state in the second operating mode.

By way of example, the detector may comprise a Hall-effect detector, and the first trigger device and the second trigger device may each comprise a magnet. The controller may be further configured to cause the second NFC device to enter a power-saving mode when the controller is in the first operational mode or the second operational mode. More particularly, the power-saving mode may comprise at least one of a passive mode or a low power tag detection mode, for example. The controller may further be configured to cause the second NFC device to enter an active mode based upon the detector not detecting the first trigger device or the second trigger device.

Also by way of example, the first mobile device accessory may comprise a mobile device charging cradle, and the second mobile device accessory may comprise a mobile device carry holster. The mobile device may further comprise a wireless transceiver carried by the housing and coupled to the controller. In particular, the mobile device may further comprise a housing configured to be removably coupled with the first mobile device accessory or the second mobile device accessory, and the second NFC device, the detector, and the controller may be carried by the housing.

A related mobile device, such as the one described briefly above, and a related communications method are also provided. The method may include determining positioning of the mobile device in the first mobile device accessory when the detector detects the first trigger device and when the second NFC device is in NFC communication with the first NFC device, and determining positioning of the mobile device in the second mobile device accessory when the detector detects the second trigger and when the second NFC device is not in NFC communication with the first NFC device. The method may further include operating the mobile device in a first operating mode based upon positioning in the first mobile device accessory, and operating the mobile device in a second operating mode different than the first operating mode based upon positioning in the second mobile device accessory.

A related non-transitory computer-readable medium is for a mobile device, such as the one described briefly above. The computer readable medium may have computer-executable instructions for causing the mobile device to perform steps comprising determining positioning of the mobile device in the first mobile device accessory when the detector detects the first trigger device and when the second NFC device is in NFC communication with the first NFC device, and determining positioning of the mobile device in the second mobile device accessory when the detector detects the second trigger and when the second NFC device is not in NFC communication with the first NFC device. Further steps may include operating the mobile device in a first operating mode based upon positioning in the first mobile device accessory, and operating the mobile device in a second operating mode different than the first operating mode based upon positioning in the second mobile device accessory.

Referring initially to FIG. 1, a communications system 30 illustratively includes a first mobile device accessory (e.g., a holder) 31 and a first trigger device 32 associated with the first mobile device holder 31. Furthermore, the system 30 also illustratively includes a second mobile device accessory (e.g., a holder) 35, which is different than the first mobile device holder 31, and a second trigger device 36 associated with the second mobile device holder 35. More particularly, in the illustrated example, the first mobile device holder 31 may comprise a charging cradle or dock for a mobile device 40, while the second mobile device holder 35 may comprise a holster, sleeve, pocket, case, cover or other accessory for holding, carrying or protecting the mobile device 40 while it is not in use. That is, the mobile device 40 illustratively includes a housing 41 that is configured to be removably coupled with the first mobile device holder 31 or the second mobile device holder 35.

Generally speaking, mobile device holsters may be configured for attachment (via a clip, loop, etc.) to a user's belt or article of clothing to provide a convenient way to carry the mobile device 40. It should be noted that other types of device holders besides those shown in the illustrated example may be used in different embodiments, or different variations of cradles and holsters may be used (e.g., a charging cradle or a non-charging cradle, belt holster or an arm-band holster, etc.). For example, some holders may be configured for use within an automobile (e.g., on a dashboard, air conditioner vent, etc.) to secure the mobile device 40 while driving or riding, etc. However, it should be noted that the first mobile device holder 31 or the second mobile device holder 35 may be otherwise carried or mounted, and may be used with various types of mobile devices 40 including mobile telephones or smartphones, personal digital assistants (PDAs), portable or personal media players (e.g., MP3 players, video players, etc.), remote controls (e.g., television or stereo remotes, etc.), portable gaming devices, tablets, electronic book readers, etc., for example.

The system 30 also illustratively includes a first near field communication (NFC) device 33 associated with the first mobile device holder 31. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters, typically 4 cm or less, but other suitable versions of near-field communication which may have different operating frequencies, effective ranges, etc., for example, may also be used. In some embodiments the first NFC device may be a passive NFC tag, for example, although it may also be an active NFC device in some embodiments as well.

The mobile device 40 further illustratively includes a second NFC device 42 carried by the housing 41 and configured to communicate with the first NFC device 33 via NFC communications. The second NFC device 42 may be configured to operate in an active NFC mode in some embodiments, although it may be configured as a passive device in other embodiments as well. The mobile device 40 also illustratively includes a detector 43 carried by the housing 41 and configured to detect the first trigger device 32 or the second trigger device 36, depending on whether the mobile device is being coupled to or positioned in to the first mobile device holder 31 or the second mobile device holder 35, respectively. By way of example, the first trigger device 32 and the second trigger device 36 may each comprise a magnet, in which case the detector 43 may comprise a detector such as a Hall-effect detector or sensor, for example. However, other trigger devices, such as an electrical conductor that closes an electronic detector circuit in the mobile device 41, optical trigger devices for an optical detector, etc., may also be used in different embodiments.

The mobile device 40 also illustratively includes a controller 44 carried by the housing 41 and coupled to the second NFC circuit 42 and the detector 43. The controller 44 may be implemented using a combination of hardware (e.g., microprocessor, memory, etc.) and non-transitory computer-readable medium components, to perform the various operations discussed below.

Figure 4:
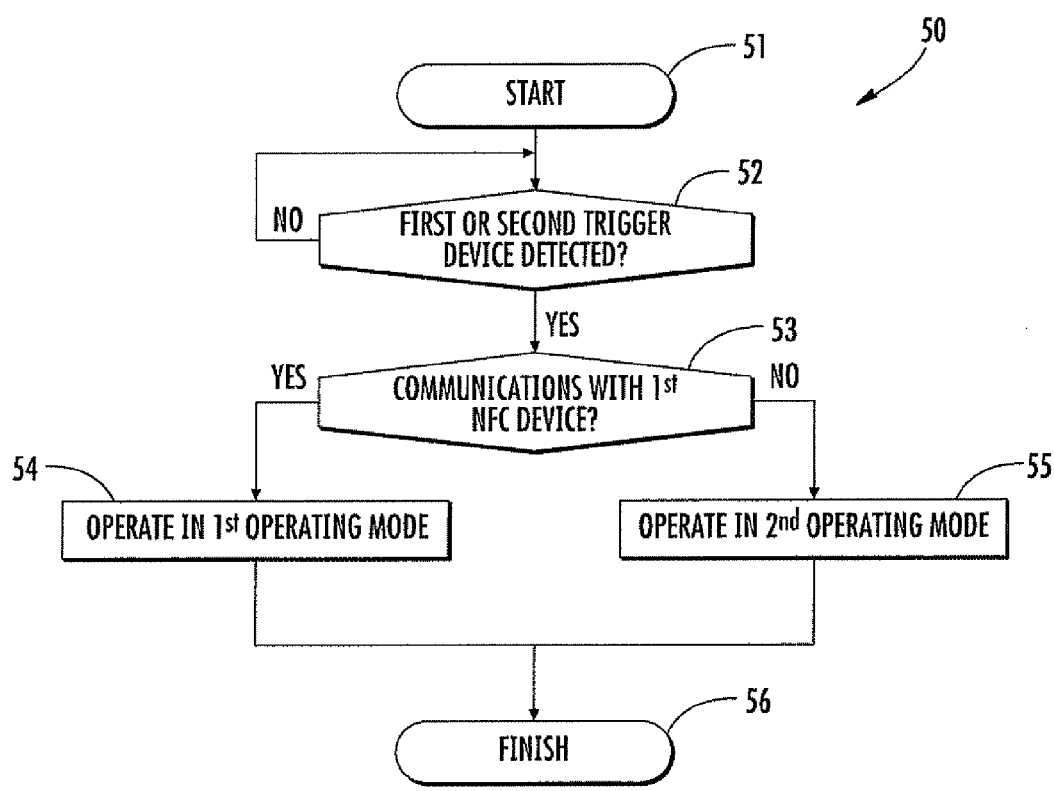
FIGS. 4 and 5 are flow diagrams illustrating method aspects associated with the systems of FIGS. 1 and 2.

Referring additionally to the flow diagram 50 of FIG. 4, respectively, beginning at Block 51, the controller 44 may be configured to determine positioning adjacent or in the first mobile device holder 31 when the detector 43 detects the first trigger device 32 (Block 52) and when the second NFC device 42 is in NFC communication with the first NFC device 33 (Block 53). On the other hand, the controller 44 may determine positioning adjacent or in the second mobile device holder 35 when the detector 43 detects the second trigger device 36 and when the second NFC device 42 is not in NFC communication with the first NFC device 33. In other words, detection of the first trigger device 32 or the second trigger device 36 informs the controller 44 that it has been positioned in a holder generally, but at this point it would otherwise not know what type of holder it has been coupled to simply based upon detection of a magnet, etc. However, when the first mobile device holder 31 has an NFC device 33 associated therewith and the second mobile device 35 does not have an NFC device associated therewith, the presence or absence of NFC device detection combined with a trigger device detection allows the controller 44 to advantageously determine whether the mobile device 40 has been coupled to the first mobile device holder 31 or the second mobile device holder 35, respectively.

As such, the controller 44 may therefore operate in a first operating mode based upon positioning in the first mobile device holder 31 (Block 54), and operate in a second operating mode different than the first operating mode based upon positioning in the second mobile device holder 35 (Block 55), which concludes the illustrated method of FIG. 4 (Block 56). In other words, the mobile device 40 may advantageously provide different operating features by using NFC to identify a respective type of holder it is placed in.

Figure 3:
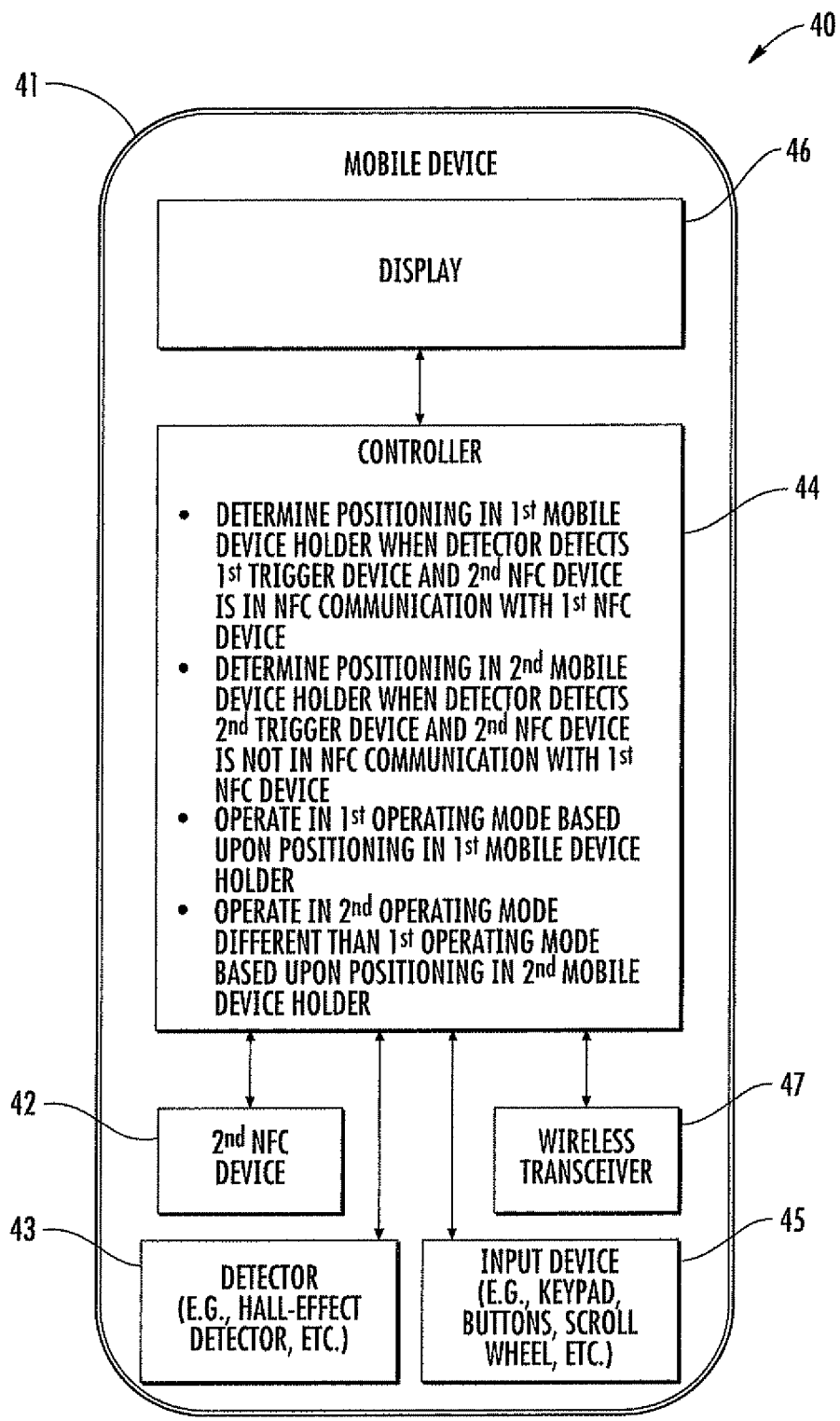
FIG. 3 is a schematic block diagram of an example mobile device of the system of FIG. 1 shown in greater detail.
Figure 5:
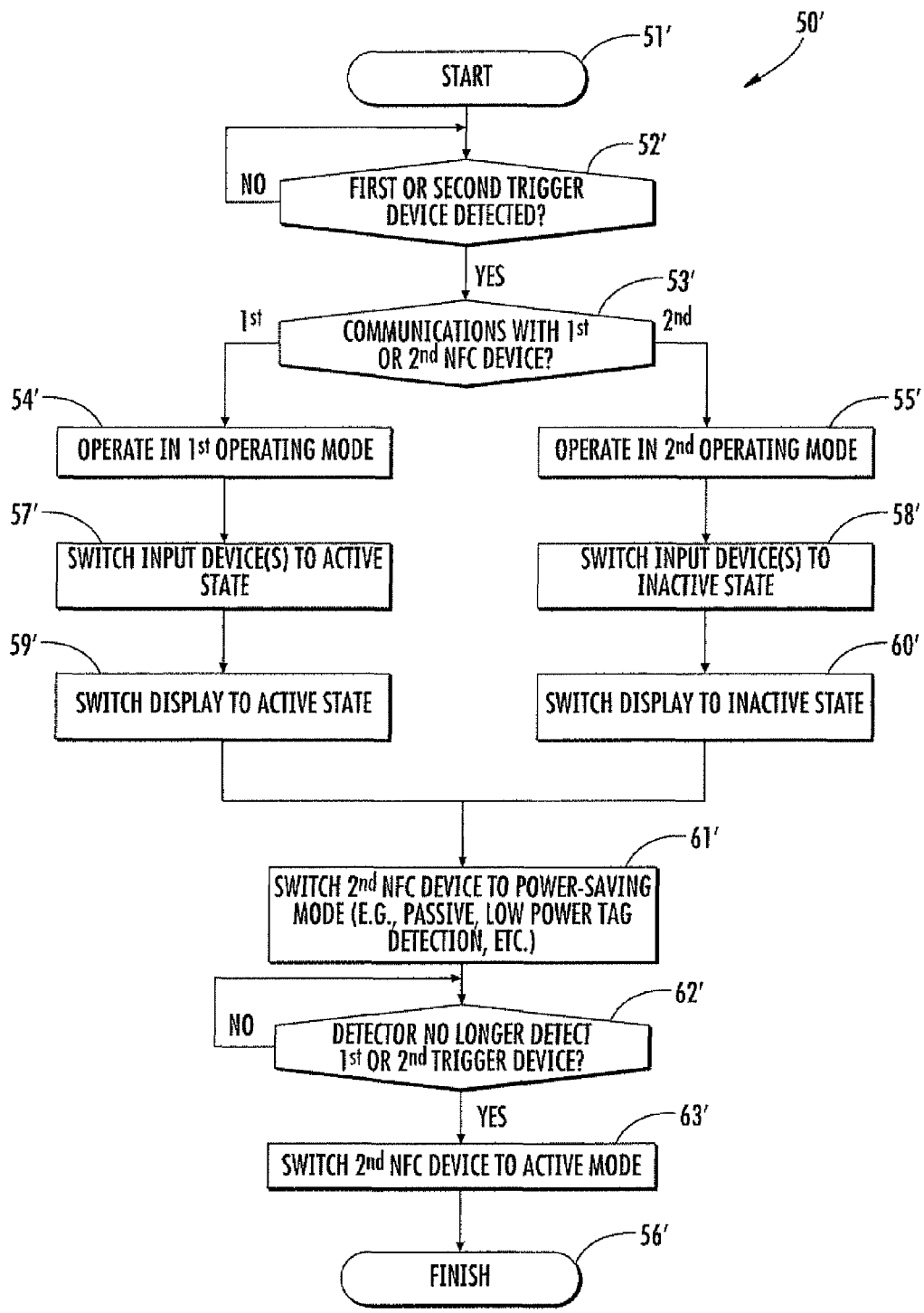
Figure 6:
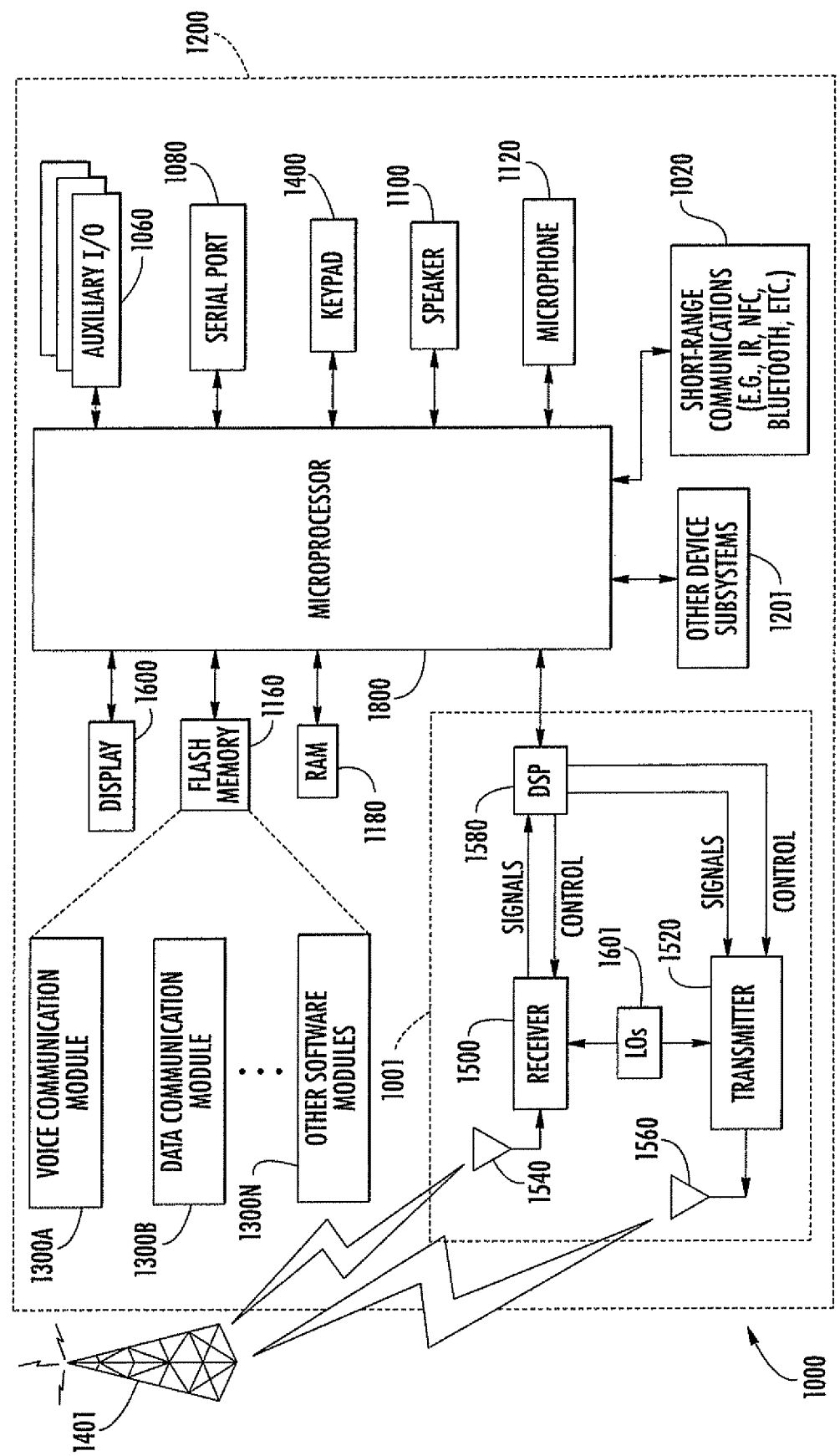
FIG. 6 is a schematic diagram illustrating example components that may be used with the mobile devices of FIGS. 1 through 3.

By way of example, referring additionally to FIGS. 3 and 5, the mobile device 40 may further comprise one or more input devices 45 (e.g., keypad or keyboard, buttons, track pad, scroll wheel, touchscreen sensor array, etc.) carried by the housing 41 and coupled to the controller 44 and switchable between active and inactive states. In the active state, the input device(s) 45 may be enabled to provide input to the controller 44, and in the inactive state may be disabled from providing input to the controller. Generally speaking, it may be advantageous to allow the input device(s) 45 to provide input when in a cradle, but not when in a holster, so as to avoid unintended input when in the holster. In this regard, the controller 44 may be configured to switch the input device(s) 45 to the active state in the first operating mode (i.e., when positioned in the first mobile device holder 31), at Block 57', and to the inactive state in the second operating mode (i.e., when positioned in the second device holder 35), at Block 58'.

Similarly, the mobile device 40 may further comprise a display 46 carried by the housing 41 and coupled to the controller 44 which is also switchable between active and inactive states. As such, the controller 44 may be further configured to switch the display 46 to the active state in the first operating mode, at Block 59', and to the inactive state in the second operating mode, at Block 60'. The mobile device 40 may further include a wireless transceiver 47 (e.g., WiFi, Bluetooth, cellular, WiMAX, etc.) carried by the housing 41 and coupled to the controller 44.

Figure 2:
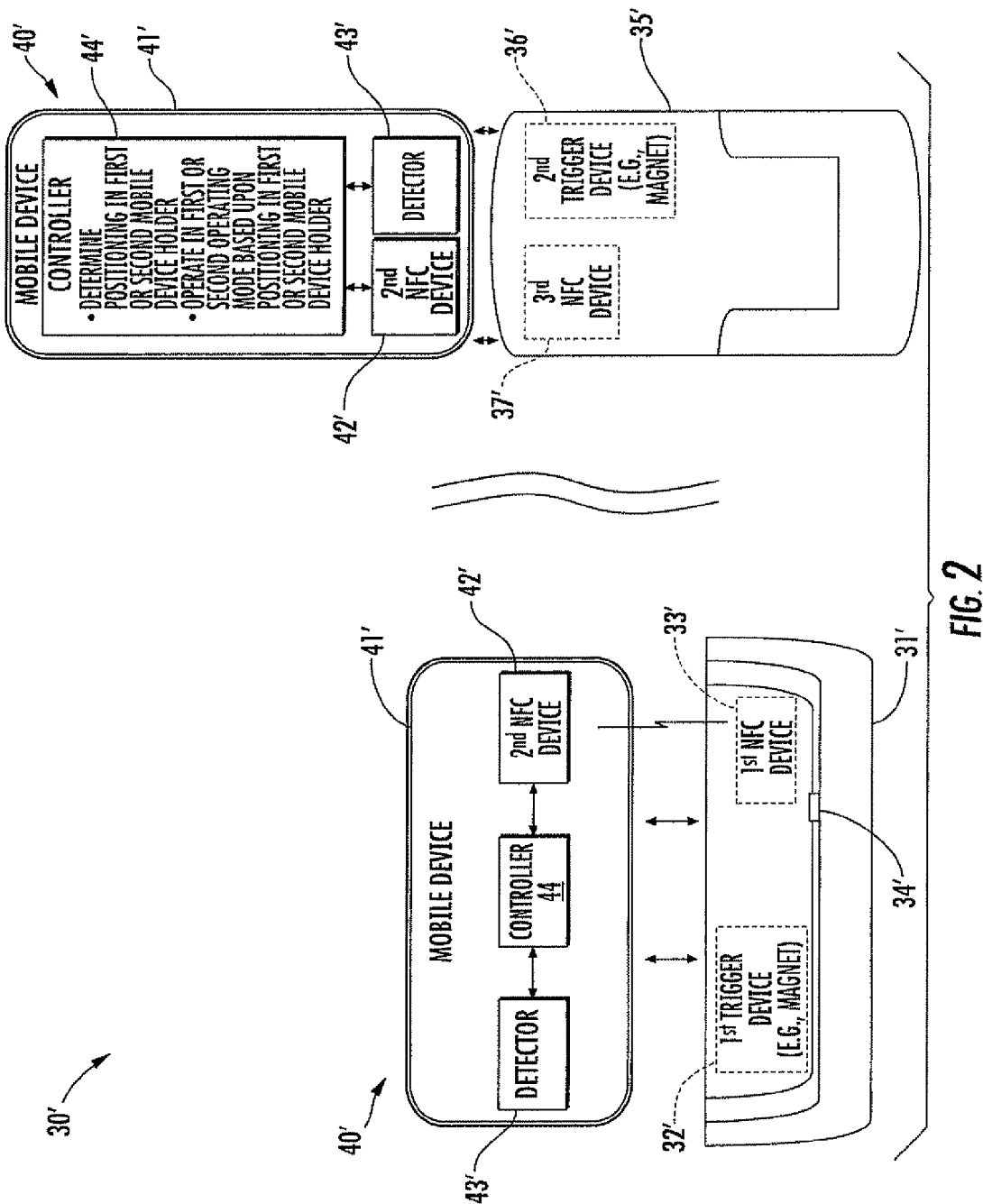
FIG. 2 is a schematic block diagram of an alternative embodiment of the communications system of FIG. 1.

Referring additionally to FIG. 2, in some embodiments a third NFC device 37' may also be associated with the second mobile device holder 35'. As such, the controller 44' may be configured to determine positioning in the second mobile device holder 35' when the detector detects the second trigger device (Block 52') and when the second NFC device 42' is in NFC communication with the third NFC device 37', at Block 53'. By way of example, in this configuration the first NFC device 33' and the third NFC device 37' may have different unique identifications (UIDs) associated therewith, so that the controller 44' will be able to determine whether it is communicating with a cradle or holster NFC device, for example, based upon the given UID that is provided. That is, different types of holders may have different UIDs associated with the respective NFC devices. Another approach is that the first NFC device 33' and the third NFC device 37' may use different NFC protocol types, which may be used to distinguish their respective different types of holders (e.g., ISO/IEC 18092, ISO 14443-4 Type A/B, ISO/IEC 15963, etc.). Any of the remaining components 30'-44' not specifically discussed herein are similar to their counterpart components with similar non-prime reference numerals previously described above with reference to FIG. 1, and therefore require no further discussion herein.

The controller 44 may be further configured to cause the second NFC device 42 to enter a power-saving mode when the controller is in the first operational mode or the second operational mode, at Blocks 61'-62'. That is, because the controller 44 is able to determine that it is in the first mobile device holder 31 or the second mobile device holder 35 based upon detection of the first trigger device 32 or the second trigger device 36, respectively, the controller may advantageously only scan once for the first NFC device 33 (or the third NFC device 37' in some embodiments), and then cease scanning until the detector 43 no longer detects the first trigger device or second trigger device. By way of example, the power-saving mode may comprise a passive NFC mode, although in some embodiments a reduced amount of NFC tag scanning may still be used, such as in a low power tag detection mode. In this way, the controller 44 may relatively easily take advantage of NFC functionality to distinguish between different types of holders, yet while also providing enhanced power saving through decreased (or no) NFC usage while in a holder.

When the detector 43 no longer detects the first trigger device 32 or the second trigger device 36, the controller 44 may be further configured to cause the second NFC device 42 to resume NFC scanning, such as by entering an active NFC mode, at Block 63', which illustratively concludes the method of FIG. 5 (Block 56'). Any of the blocks 51'-56' not specifically referenced herein are similar to their counterpart blocks with the same non-prime reference numerals described above with reference to FIG. 4, and therefore require no further discussion herein.

It should also be noted that the controller 44 may take additional information into account when determining whether to enter a power-saving mode. For example, the controller 44 may also detect, upon being coupled with the charging cradle 31, whether power is being supplied to the cradle. In the illustrated example, a plug 34 (e.g., USB, micro-USB, etc.) is used to plug into the mobile device 41 to provide power for charging a battery of the mobile device (not shown), and in some embodiments for providing signal connection to a computer for file synchronization, etc. Thus, for example, if the controller 44 detects that power is being supplied by the plug 34, it may be configured to leave the second NFC device 42 in an active or otherwise relatively high-power NFC mode, since battery drain is not a concern while the mobile device 40 is being charged. On the other hand, if no power is detected, then the controller 44 may cause the second NFC device 42 to enter the power-saving mode, as described above. Similarly, when the mobile device 40 is positioned in a holder where power is not being supplied, the controller 44 may allow the second NFC device 42 to remain in a normal operating mode until a power level of the battery drops below a battery threshold level.

Example components of a mobile wireless communications device 1000 that may be used in accordance with the above-described embodiments are further described below with reference to FIG. 5. The device 1000 illustratively includes a housing 1200, a keypad or keyboard 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. For example, a power mode switching application may be used for controlling switching between different power consumption modes. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, NFC or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communications system comprising:
  a first mobile device accessory and a first trigger device associated with said first mobile device accessory;

a second mobile device accessory different than the first mobile device accessory and a second trigger device associated with said second mobile device accessory;
a first near field communication (NFC) device associated with said first mobile device accessory; and
a mobile device comprising
a second NFC device configured to communicate with said first NFC device via NFC communications,
a detector configured to detect said first trigger device or said second trigger device, and
a controller configured to
determine positioning of said mobile device adjacent said first mobile device accessory when said detector detects said first trigger device and when said second NFC device is in NFC communication with said first NFC device,
determine positioning of said mobile device adjacent said second mobile device accessory when said detector detects said second trigger device and when said second NFC device is not in NFC communication with said first NFC device,
operate in a first operating mode based upon positioning adjacent said first mobile device accessory, and
operate in a second operating mode different than the first operating mode based upon positioning adjacent said second mobile device accessory.

2. The communications system of claim 1 further comprising a third NFC device associated with said second mobile device accessory; and wherein said controller is configured to determine positioning of said mobile device adjacent said second mobile device accessory when said detector detects said second trigger device and when said second NFC device is in NFC communication with said third NFC device.

3. The communications system of claim 1 wherein said mobile device further comprises at least one input device coupled to said controller and switchable between active and inactive states; and wherein said controller is further configured to switch said at least one input device to the active state in the first operating mode, and to the inactive state in the second operating mode.

4. The communications system of claim 1 wherein said mobile device further comprises a display coupled to said controller and switchable between active and inactive states; and wherein said controller is further configured to switch said display to the active state in the first operating mode, and to the inactive state in the second operating mode.

5. The communications system of claim 1 wherein said detector comprises a Hall-effect detector; and wherein said first trigger device and said second trigger device each comprises a magnet.

6. The communications system of claim 1 wherein said controller is further configured to cause said second NFC device to enter a power-saving mode when said controller is in the first operating mode or the second operating mode.

7. The communications system of claim 6 wherein the power-saving mode comprises at least one of a passive mode or a low power tag detection mode.

8. The communications system of claim 1 wherein said controller is further configured to cause said second NFC device to enter an active mode based upon said detector not detecting said first trigger device or said second trigger device.

9. The communications system of claim 1 wherein said first mobile device accessory comprises a mobile device charging cradle; and wherein said second mobile device accessory comprises a mobile device carry holster.

10. The communications system of claim 1 wherein said mobile device further comprises a wireless transceiver coupled to said controller.

11. The communications system of claim 1 wherein said mobile device further comprises a housing configured to be removably coupled with said first mobile device accessory or said second mobile device accessory; and wherein said second NFC device, said detector, and said controller are carried by said housing.

12. A mobile device for use with a first mobile device accessory or a second mobile device accessory, the first mobile device accessory having a first trigger device and a first near field communication (NFC) device associated therewith, and the second mobile device accessory being different than the first mobile device accessory and having a second trigger device associated therewith, the mobile device comprising:
a second NFC device configured to communicate with the first NFC device via NFC communications;
a detector configured to detect the first trigger device or the second trigger device; and
a controller configured to
determine positioning of the mobile device adjacent the first mobile device accessory when said detector detects the first trigger device and when said second NFC device is in NFC communication with the first NFC device,
determine positioning of the mobile device adjacent the second mobile device accessory when said detector detects the second trigger device and when said second NFC device is not in NFC communication with the first NFC device,
operate in a first operating mode based upon positioning adjacent the first mobile device accessory, and
operate in a second operating mode different than the first operating mode based upon positioning adjacent the second mobile device accessory.

13. The mobile device of claim 12 wherein said controller is configured to determine positioning of the mobile device adjacent the second mobile device accessory when said detector detects the second trigger device and when said second NFC device is in NFC communication with a third NFC device associated with the second mobile device accessory.

14. The mobile device of claim 12 further comprising at least one input device coupled to said controller and switchable between active and inactive states; and wherein said controller is further configured to switch said at least one input device to the active state in the first operating mode, and to the inactive state in the second operating mode.

15. The mobile device of claim 12 further comprising a display coupled to said controller and switchable between active and inactive states; and wherein said controller is further configured to switch said display to the active state in the first operating mode, and to the inactive state in the second operating made.

16. The mobile device of claim 12 wherein said detector comprises a Hall-effect detector.

17. A communications method for use with a mobile device configured to be removably coupled with a first mobile device accessory or a second mobile device accessory, a second NFC device configured to communicate with the first NFC device via NFC communications, and a detector configured to detect the first trigger device or the second trigger device, the first mobile device accessory having a first trigger device and a first near field communication (NFC) device associated therewith, and the second mobile device accessory being different than the first mobile device accessory and having a second trigger device associated therewith, the method comprising:
- determining positioning of the mobile device adjacent the first mobile device accessory when the detector detects the first trigger device and when the second NFC device is in NFC communication with the first NFC device;
- determining positioning of the mobile device adjacent the second mobile device accessory when the detector detects the second trigger device and when the second NFC device is not in NFC communication with the first NFC device;
- operating the mobile device in a first operating mode based upon positioning adjacent the first mobile device accessory; and
- operating the mobile device in a second operating mode different than the first operating mode based upon positioning adjacent the second mobile device accessory.

18. The method of claim 17 wherein determining positioning of the mobile device adjacent the second mobile device accessory comprises determining positioning of the mobile device adjacent the second mobile device accessory when the detector detects the second trigger device and when the second NFC device is in NFC communication with a third NFC device associated with the second mobile device accessory.

19. The method of claim 17 wherein the mobile device further comprises at least one input device switchable between active and inactive states; and further comprising switching the at least one input device to the active state in the first operating mode, and to the inactive state in the second operating mode.

20. The method of claim 17 wherein the mobile device further comprises a display switchable between active and inactive states; and further comprising switching the display to the active state in the first operating mode, and to the inactive state in the second operating mode.

21. The method of claim 16 wherein the detector comprises a Hall-effect detector; and wherein the first trigger device and the second trigger device each comprises a magnet.

22. A non-transitory computer-readable medium for a mobile device configured to be removably coupled with a first mobile device accessory or a second mobile device accessory, a second NFC device configured to communicate with the first NFC device via NFC communications, and a detector configured to detect the first trigger device or the second trigger device, the first mobile device accessory having a first trigger device and a first near field communication (NFC) device associated therewith, and the second mobile device accessory being different than the first mobile device accessory and having a second trigger device associated therewith, the computer-readable medium having computer-executable instructions for causing the mobile device to perform steps comprising:
- determining positioning of the mobile device adjacent the first mobile device accessory when the detector detects the first trigger device and when the second NFC device is in NFC communication with the first NFC device;
- determining positioning of the mobile device adjacent the second mobile device accessory when the detector detects the second trigger device and when the second NFC device is not in NFC communication with the first NFC device;
- operating the mobile device in a first operating mode based upon positioning adjacent the first mobile device accessory; and
- operating the mobile device in a second operating mode different than the first operating mode based upon positioning adjacent the second mobile device accessory.

23. The computer-readable medium of claim 22 wherein determining positioning of the mobile device adjacent the second mobile device accessory comprises determining positioning of the mobile device adjacent the second mobile device accessory when the detector detects the second trigger device and when the second NFC device is in NFC communication with a third NFC device associated with the second mobile device accessory.

24. The computer-readable medium of claim 22 wherein the mobile device further comprises at least one input device carried by the housing and switchable between active and inactive states; and further having computer-executable instructions for causing the mobile device to switch the at least one input device to the active state in the first operating mode, and to the inactive state in the second operating mode.

25. The computer-readable medium of claim 22 wherein the mobile device further comprises a display carried by the housing and switchable between active and inactive states; and further having computer-executable instructions for causing the mobile device to switch the display to the active state in the first operating mode, and to the inactive state in the second operating mode.

* * * * *